United States Patent
Chung

(10) Patent No.: US 8,951,679 B2
(45) Date of Patent: Feb. 10, 2015

(54) BETA ALUMINA SOLID ELECTROLYTE AND METHOD OF PREPARING THE SAME

(75) Inventor: Byung-Joo Chung, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 667 days.

(21) Appl. No.: 13/200,215

(22) Filed: Sep. 20, 2011

(65) Prior Publication Data

US 2012/0141879 A1   Jun. 7, 2012

(30) Foreign Application Priority Data

Dec. 6, 2010   (KR) .................. 10-2010-0123474

(51) Int. Cl.
*H01M 6/18*   (2006.01)
*H01M 10/0562*   (2010.01)
*B82Y 30/00*   (2011.01)
*B82Y 40/00*   (2011.01)
*H01M 10/052*   (2010.01)

(52) U.S. Cl.
CPC ........... *H01M 10/0562* (2013.01); *B82Y 30/00* (2013.01); *B82Y 40/00* (2013.01); *H01M 10/052* (2013.01); *H01M 2300/0068* (2013.01); *Y02E 60/122* (2013.01)
USPC .......................................... 429/320; 429/305

(58) Field of Classification Search
CPC ................. H01M 10/0562; H01M 2300/0068; Y02E 60/122
USPC .................................................. 429/320, 305
IPC .......................................... H01M 6/18, 10/0562
See application file for complete search history.

(56) References Cited

U.S. PATENT DOCUMENTS

| 4,610,866 A | 9/1986 | Debsikdar et al. |
| 6,419,875 B1 | 7/2002 | Kitagawa et al. |

FOREIGN PATENT DOCUMENTS

| JP | 05-162114 | 6/1993 |
| JP | 07-061813 | 3/1995 |
| JP | 07-277836 | 10/1995 |
| JP | 9-221356 A | 8/1997 |
| JP | 10-59714 | 3/1998 |
| JP | 2000-226251 | 8/2000 |
| JP | 2001-192260 | 7/2001 |
| JP | 2003-335517 | 11/2003 |
| KR | 10-2002-0038210 A | 5/2002 |

OTHER PUBLICATIONS

KIPO Registration Determination Certificate dated Nov. 27, 2012 in priority KR Application No. 10-2010-0123474 (4 pages), acknowledged.
English Machine Translation of JP 05-162114; 12 pages.
English Machine Translation of JP 07-061813, 12 pages.
English Machine Translation of JP 07-277836, 17 pages.
English Machine Translation of JP 10-059714, 12 pages.
English Machine Translation of JP 2003-335517, 19 pages.
Korean Office action dated May 8, 2012 issued in Korean priority patent application No. 10-2010-0123474, 3 pages, acknowledged.

*Primary Examiner* — Basia Ridley
*Assistant Examiner* — Heng Chan
(74) *Attorney, Agent, or Firm* — Christie, Parker & Hale, LLP

(57) ABSTRACT

A beta alumina solid electrolyte (BASE) and a method of preparing the same are provided. When the method is used, evaporation of sodium is suppressed and thus a beta alumina solid electrolyte having a high density, a low porosity, and a composition that is near a desired (target) composition is produced.

12 Claims, 4 Drawing Sheets

BETA ALUMINA SOLID ELECTROLYTE AND METHOD OF PREPARING THE SAME

CROSS-REFERENCE TO RELATED APPLICATION

This application claims priority to and the benefit of Korean Patent Application No. 10-2010-0123474, filed on Dec. 6, 2010, in the Korean Intellectual Property Office, the entire content of which is incorporated herein by reference.

BACKGROUND

1. Field

One or more embodiments of the present invention relate to a beta alumina solid electrolyte that is used in a thermoelectric converter, a battery, a sensor, and a display; and a method of preparing the beta alumina solid electrolyte.

2. Description of the Related Art

Beta alumina has high sodium ion conductivity, and due to the high sodium ion conductivity, beta alumina is used as a solid electrolyte for use in an alkali metal thermoelectric converter, a sodium-based secondary battery, such as a Na—S secondary battery, and various sensors and displays.

A beta alumina is represented by $Na_2O \cdot xAl_2O_3$ (where x is from 5 to 11), and is present in two different crystal structures of β-alumina and β"-alumina. In general, a beta alumina includes β-alumina, β"-alumina, or a mixture thereof. Also, since β"-alumina has much higher sodium ion conductivity than β-alumina, β"-alumina or a mixture including β"-alumina and β-alumina is often used as a solid electrolyte.

The beta alumina may be prepared by using a solid state method in which powder of oxides, such as $Na_2O$ or $Al_2O_3$, are mixed and the mixture is sintered. However, when the solid state method is used to prepare beta-alumina, the beta alumina may have a low sintering density and a high porosity and thus, Na is concentrated near pores, and thus, the beta alumina has low durability and low electrical characteristics. In addition, since the solid state method is used at a high temperature, a great concentration of Na may evaporate during sintering, and thus, it is difficult to embody a desired (target) composition.

Accordingly, there is a need to develop a method of preparing beta alumina that provides a solid electrolyte having high density in which evaporation of Na during sintering is suppressed.

SUMMARY

An aspect of an embodiment of the present invention is directed toward a method of preparing a beta alumina solid electrolyte having a high density, a low porosity, and a desired (target) composition capable of suppressing evaporation of sodium.

An aspect of an embodiment of the present invention is directed toward a beta alumina solid electrolyte having a high density and a low porosity.

Additional aspects will be set forth in part in the description which follows and, in part, will be apparent from the description, or may be learned by practice of the presented embodiments.

According to one or more embodiments of the present invention, a method of preparing a beta alumina solid electrolyte. The method includes: mechanically pulverizing a mixture comprising $Al(OH)_3$, a sodium-containing compound, and a solvent; heat treating the mixture at a temperature of about 500° C. to about 900° C.; and sintering the mixture.

According to one or more embodiments of the present invention, a beta alumina solid electrolyte includes nano-sized beta alumina primary particles, wherein a porosity of the beta alumina solid electrolyte is less than 2%.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
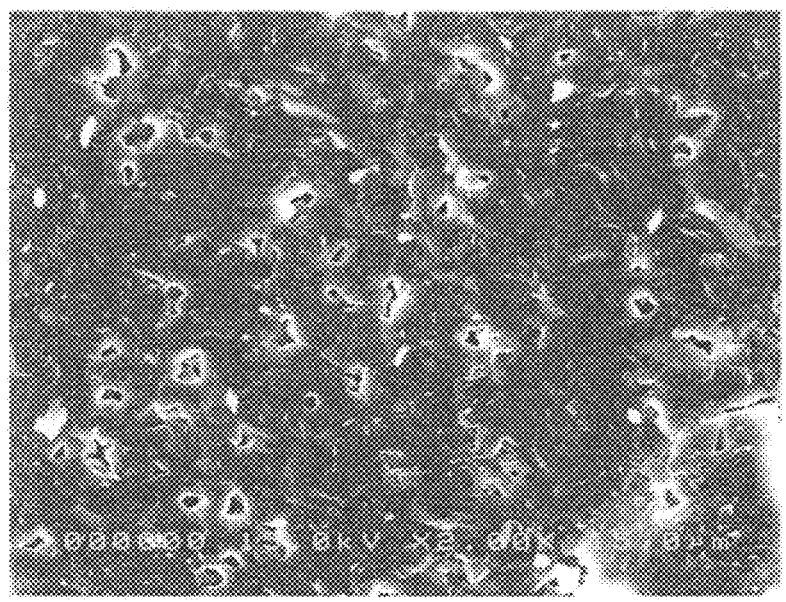
FIGS. 1 and 2 show scanning electron microscope (SEM) images of a beta alumina solid electrolyte prepared according to Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

An alkali metal thermoelectric converter (AMTEC) is an energy conversion device that directly converts heat energy into electrical energy, in which, if a temperature difference (ΔT) occurs between ends of a beta alumina solid electrolyte (also called BASE) having ion conductivity, a vapor pressure difference of liquid Na filling a beta alumina solid electrolyte cell functions as an actuating force, thereby allowing $Na^+$ ions to flow into a space between oxygen atoms that are weakly bonded to each other to form a lattice structure. During a condensing process, $Na^+$ ions that have passed through the beta alumina solid electrolyte are neutralized at a surface of an electrode, thereby generating electricity. In this case, an output has a voltage of about 0.7V to about 2.0V and a current density of about 0.7 A/cm² to about 1.2 A/cm². Accordingly, if a plurality of beta alumina solid electrolyte cells each producing such an output having low voltage and high current density are modulated, then a large-capacity of energy may be realized.

A beta alumina solid electrolyte, which is a key element of an AMTEC, should be formed to have as high of a density as possible in order to increase strength and durability of the beta alumina solid electrolyte. If a solid electrolyte has low density, then its strength may be low due to fine pores present therein, and high internal resistance may cause more sodium ions to flow intensively near the pores and current channeling may occur, and thus, durability of a solid electrolyte may be lowered. According to a method of preparing a beta alumina solid electrolyte by using a comparable solid state method, the sodium used in this method strongly evaporates during sintering and thus it is difficult to realize a desired (target)

composition, and also a beta alumina solid electrolyte formed by using this comparable method has low density, low strength, and low durability.

In a method of preparing a beta alumina solid electrolyte according to an embodiment of the present invention, an evaporation resistance is increased by adsorbing sodium to $Al_2O_3$, thereby suppressing evaporation of sodium occurring during sintering and producing a beta alumina solid electrolyte having high density.

A method of preparing a beta alumina solid electrolyte according to an embodiment of the present invention includes mechanically pulverizing a mixture including $Al(OH)_3$, a sodium-containing compound, and a solvent; heat treating the mixture at a temperature of about 500° C. to about 900° C. (or of 500° C. to 900° C.); and sintering the mixture.

In the method of preparing the beta alumina solid electrolyte, the mixture including $Al(OH)_3$ and the sodium-containing compound as a raw material, and the solvent are used. Examples of the sodium-containing compound are sodium hydroxide (NaOH), sodium carbonate ($Na_2CO_3$), sodium nitrate ($NaNO_3$), sodium sulfate ($Na_2SO_4$), sodium alkoxide (NaOR, where R is a substituted or unsubstituted C1 to C5 alkyl group), and/or sodium oxalate ($Na_2C_2O_4$).

The beta alumina solid electrolyte may be represented by $Na_2O \cdot xAl_2O_3$ (where x is 5 to 11), and a mole ratio of the Al element and the Na element may be 5:1 to 11:1. In consideration of a final composition of the beta alumina solid electrolyte and unreacted reactants that do not react during the reaction, amounts of $Al(OH)_3$ and the sodium-containing compound, which are raw materials, may be controlled such that a mole ratio of the Al element of $Al(OH)_3$ to the Na element of the sodium-containing compound is, for example, about 4:1 to about 11:1 (or for example, 4:1 to 11:1). However, the amounts of the raw materials are not limited thereto, and may vary according to a reaction environment, as long as the amounts are within a conventional range. The $Al(OH)_3$ and the sodium-containing compound may be mixed with a solvent. The solvent may be, for example, water, alcohol, acetone, or a combination thereof. The solvent may be any one of various solvents that dissolve the sodium-containing compound.

$Al(OH)_3$ has very low solubility to water, alcohol, or acetone. For example, solubility of $Al(OH)_3$ to water is 0.0001 g/100 ml (20° C.), and thus, even when $Al(OH)_3$ is mixed with the solvent, $Al(OH)_3$ may hardly dissolve. In contrast, the sodium-containing compound can be dissolved in a solvent to a certain degree, although the solubility level may differ according to which solvent is used and/or which sodium-containing compound is used with the solvent. For example, solubility of sodium hydroxide (NaOH) to water is 1110 g/L (20° C.), solubility of sodium carbonate ($Na_2CO_3$) to water is 22 g/100 ml (20° C.), solubility of sodium nitrate ($NaNO_3$) to water is 921 g/L (25° C.), solubility of sodium sulfate ($Na_2SO_4$) to water is 47.6 g/L (0° C.), and solubility of sodium oxalate ($Na_2C_2O_4$) to water is 3.7 g/100 ml (20° C.). Accordingly, if the sodium-containing compound is mixed with the solvent, the sodium-containing compound is dissolved and ionized into $Na^+$ and a counter anion.

If the amount of the solvent used to prepare the mixture is too low, the sodium-containing compound may not be sufficiently dissolved. On the other hand, if the amount of the solvent used to prepare the mixture is too high, a mechanical pulverizing efficiency may be lowered. Accordingly, the amount of the solvent may be adjusted to be in such a range that the mixture is mechanically pulverized and the sodium-containing compound is sufficiently dissolved. For example, the amount of the solvent may be about 100 parts by weight to about 500 parts by weight (or 100 parts by weight to 500 parts by weight), based on 100 parts by weight of a solid powder of the raw materials, that is, the mixture including $Al(OH)_3$ and the sodium-containing compound, but is not limited thereto.

The mixture is mechanically pulverized. The mechanical pulverizing may be performed by using, for example, a planetary ball mill, an electrically-powered ball mill, a vibration ball mill, and/or a high-speed mixer. Through the mechanical pulverizing, $Al(OH)_3$ that has not been dissolved in the solvent may be pulverized into a fine powder having a nano particle size (e.g., pulverized into nano-size particles or particles in nano-size scale), and $Na^+$ ions are uniformly adsorbed to $Al(OH)_3$.

Subsequently, the pulverized mixture is heat treated at a temperature of about 500° C. to about 900° C. Through the heat treatment, $Al(OH)_3$, which has an amorphous structure, is phase-transformed into $Al_2O_3$, which has a crystal structure. In this regard, when $Al(OH)_3$ is transformed into $Al_2O_3$, $Na^+$ adsorbed to $Al(OH)_3$ is trapped in the $Al_2O_3$ structure and thus, the Na element may not evaporate. In general, when a sodium-containing compound, such as NaOH or $Na_2CO_3$, is heated, the sodium-containing compound decomposes into $Na_2O$ while gas is generated. However, when the heat treatment is performed as described above, since the sodium-containing compound is dissolved in the solvent and thus $Na^+$ ions are adsorbed to $Al(OH)_3$, the sodium-containing compound does not decompose into $Na_2O$, and Al directly reacts with Na and O to form the beta alumina solid electrolyte.

Regarding a conventional solid state method in which sintering is performed using $Na_2O$, $Al_2O_3$, etc. at high temperature, when $Na_2O$ enters the $Al_2O_3$ structure during sintering, $Na_2O$ evaporates strongly and thus, it is difficult to realize a desired (target) composition of a beta alumina solid electrolyte. However, according to the method of preparing the beta alumina solid electrolyte according to the present embodiment, during the heat treatment process, Na+ that is adsorbed to $Al(OH)_3$ is directly trapped in the $Al_2O_3$ structure through a reaction between Al and Na or O, thereby preventing or reducing evaporation of $Na_2O$. Thus, a beta alumina solid electrolyte having a desired (target) composition may be produced without loss of the Na component.

According to an embodiment of the present invention, the heat treatment temperature may be about 500° C. to about 900° C. For example, the heat treatment temperature may be about 600° C. to about 850° C. (or 600° C. to 850° C.). In one embodiment, if the heat treatment temperature is within the ranges described above, Na is stably placed in the $Al_2O_3$ structure, and a size of beta alumina primary particles that form a phase of the beta alumina solid electrolyte is controlled at a nano scale.

According to an embodiment of the present invention, the method may further include sintering a heat treated product. Also, the heat treated product may be pulverized before the sintering.

The heat treated product already includes the phase of the beta alumina solid electrolyte, and Na is trapped in the $Al_2O_3$ structure to increase an evaporation resistance of Na and thus, even when the heat treated product is sintered, a composition of a stable sintered product may be at almost the same level as a desired (target) composition so that there is no need to be concerned that evaporation of Na may occur. Also, since a particle size of beta alumina primary particles is already controlled to a nano scale through the heat treatment process, a sintered product having a finer structure may be obtained at a lower temperature.

A sintering temperature during the sintering may not be limited, and may be lower than in conventional cases. For example, the sintering may be performed at a temperature of about 1200° C. to about 2000° C. (or 1200° C. to 2000° C.). According to an embodiment of the present invention, the sintering temperature may be equal to or higher than about 1200° C. and lower than about 1700° C. (or at 1200° C. or 1700° C. or between 1200° C. and 1700° C.), for example, about 1400° C. to about 1600° C. (or at 1400° C. or 1600° C. or between 1400° C. and 1600° C.). The sintering may be performed at a high temperature (for example, about 1700° C. to about 1800° C.) at which a conventional solid state method is performed. Also, the sintering may be performed at a relatively low temperature, for example, lower than 1700° C. to produce a sintered product having high density. If sintering is performed at the low temperature, a high-density sintered product may be produced while evaporation of Na is more efficiently suppressed so as to easily perform sintering at low temperature.

A beta alumina solid electrolyte produced by using the method described above has a higher density, a much lower porosity, and a much higher crystallization degree than a commercially available beta alumina solid electrolyte. Such features were confirmed through experimental examples.

Hereinafter, a beta alumina solid electrolyte according to an embodiment of the present invention will be described in more detail.

The beta alumina solid electrolyte according to the present embodiment includes nano-sized beta alumina primary particles, and has porosity of less than 2%. According to an embodiment of the present invention, the porosity of the beta alumina solid electrolyte may be about 0.01% to about 1% (or be 0.01% to 1%). Such a low porosity is measured by using an Archimedes method, and is obtainable since use of nano-sized beta alumina primary particles enables production of a β-alumina solid electrolyte having high density.

As described above, the size of beta alumina primary particles is at a nano scale. According to an embodiment of the present invention, an average diameter of the beta alumina primary particles may be about 1 nm to about 500 nm. For example, an average diameter of the beta alumina primary particles may be about 1 nm to about 100 nm. For example, an average diameter of the beta alumina primary particles may be about 1 nm to about 50 nm. In one embodiment, the average diameter of the beta alumina primary particles is about 1 nm to about 80 nm (or at 1 nm or 80 nm or between 1 nm and 80 nm). In one embodiment, the average diameter of the beta alumina primary particles is about 10 nm to about 50 nm (or at 10 nm or 50 nm or between 10 nm and 50 nm). The nano-sized primary particles may contribute to formation of a dense matrix having a fine structure through sintering and minimization of the pore size, which is related to a strength of a material.

According to an embodiment of the present invention, a relative density of the beta alumina solid electrolyte may be 99% or more.

Among the beta alumina primary particles, no grain boundary is present. The absence of a grain boundary is confirmed by referring to a scanning electron microscope (SEM) image of the β-alumina solid electrolyte.

Also, an X-ray diffraction pattern of the beta alumina solid electrolyte was measured using a CuKα-ray and there was a strong peak intensity in the pattern. Such a result indicates that more crystallization was realized in the embodiment of the present invention than that prepared according to a conventional method.

The beta alumina solid electrolyte includes a β"-alumina crystal phase having main peaks at a diffraction angle 2θ of about 7.0° to about 8.0°, about 15.0° to about 16.0°, about 45.0° to about 46.0°, and about 66.5° to about 67.5°, and a β-alumina crystal phase having main peaks at a diffraction angle 2θ of about 18.5° to about 19.0°, about 43.5° to about 44.5°, and about 68.5° to about 70.0°, in the X-ray diffraction pattern of the beta alumina solid electrolyte.

Regarding the β"-alumina crystal phase, among the main peaks at the diffraction angle 2θ of about 7.0° to about 8.0°, about 15.0° to about 16.0°, about 45.0° to about 46.0°, and about 66.5° to about 67.5°, the peak at the diffraction angle 2θ of about 7.0° to about 8.0° and the peak at the diffraction angle 2θ range of about 45.0° to about 46.0°, are respectively referred to as a first peak and a second peak, and a peak intensity ratio of $I_1/I_2$ (where $I_1$ and $I_2$ respectively denote an intensity height of the first peak and an intensity height of the second peak) is about 0.3 to about 0.6 (or 0.3 to 0.6). Also, there is a third peak at a diffraction angle 2θ of about 43.5° to about 44.5°, which is not present in the case of a commercially available product. However, a peak at a diffraction angle 2θ of about 68.5° to about 70.0° (or 68.0° to 69.0°), which is present in the case of a commercially available product, is not present in the X-ray diffraction patterns of the β"-alumina crystal phase of the beta alumina solid electrolyte.

Regarding the β-alumina crystal phase, among the main peaks at the diffraction angle 2θ of about 18.5° to about 19.0°, about 43.5° to about 44.5°, and about 68.5° to about 70.0°, the peak at the diffraction angle 2θ of about 18.5° to about 19.0°, which will be referred to as a fourth peak, is not present in the case of a commercially available product. Also, within the diffraction angle 2θ range of about 68.5° to about 70.0°, the β-alumina crystal phase has two peaks and a commercially available product has only one peak.

As described above, the X-ray diffraction pattern of the beta alumina solid electrolyte is different from that of a conventional beta alumina solid electrolyte, and the beta alumina solid electrolyte according to the present embodiment is distinctive in terms of high crystallinity.

Embodiments of the present invention will be described in further detail with reference to the following examples. These examples are for illustrative purposes only and are not intended to limit the scope of the present invention.

Preparation of Beta Alumina Solid Electrolyte

EXAMPLE 1

39.0 g (0.5 mol) of Al(OH)$_3$ (molecular weight 78.00 g/mol) powder and 2.65 g (0.025 mol) of Na$_2$CO$_3$ (molecular weight 105.9884 g/mol (anhydrous)) powder were mixed with 100 ml (78.9 g) of ethanol, and the mixture was loaded into a planetary ball mill zirconia vessel together with 1.5 cm zirconia balls and then pulverized for 5 to 20 hours. Then, the pulverized mixture was heat treated using a sintering furnace at a temperature of 850° C. for 3 to 20 hours, thereby producing a beta alumina solid electrolyte phase powder including Al$_2$O$_3$ that had been phase-transformed from Al(OH)$_3$. The obtained beta alumina powder was ball-mill pulverized again, and then loaded into a planetary ball mill zirconia vessel together with 1.5 cm zirconia balls. The vessel was then sealed and pulverizing was performed thereon for 5 to 20 hours. The pulverized powder was molded by compression with a load of about 1,000 kgf/cm$^2$ to about 30,000 kgf/cm$^2$ to produce a molded product. The molded product was molded again by using a cold isostatic press to produce a final molded product. The final molded product was sintered in air at a temperature of 1500° C. for 12 hours and cooled to produce a beta alumina solid electrolyte sintered product.

EXAMPLE 2

A beta alumina solid electrolyte was prepared in the same manner as in Example 1, except that the heat treatment temperature was 800° C.

EXAMPLE 3

A beta alumina solid electrolyte was prepared in the same manner as in Example 1, except that the heat treatment temperature was 700° C.

COMPARATIVE EXAMPLE 1

D3 beta alumina that was produced by Ionotec Company was used as a solid electrolyte of Comparative Example 1.

Particle sizes of the beta alumina solid electrolyte phase powders obtained after the heat treatment in Examples 1 to 3 were measured by using BET (or the gas absorption technique (BET)), and respectively were 23.464 nm, 23.559 nm, and 14.996 nm.

Also, cross-sections of the solid electrolyte according to Comparative Example 1 and the beta alumina solid electrolyte sintered product prepared according to Example 1 were enlarged respectively by 2000 times and 4000 times and analyzed by using a scanning electron microscope (SEM), and SEM images thereof are shown in FIGS. 1 to 4.

Figure 2:
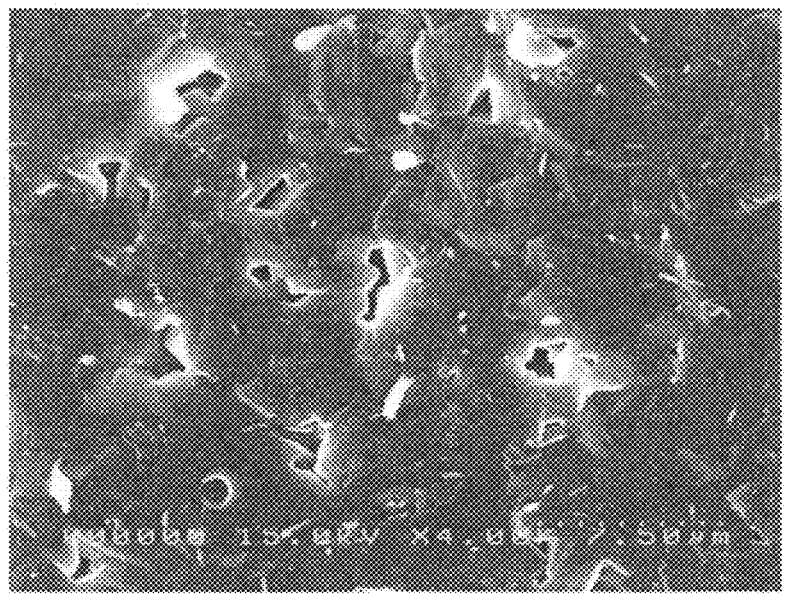
Figure 3:
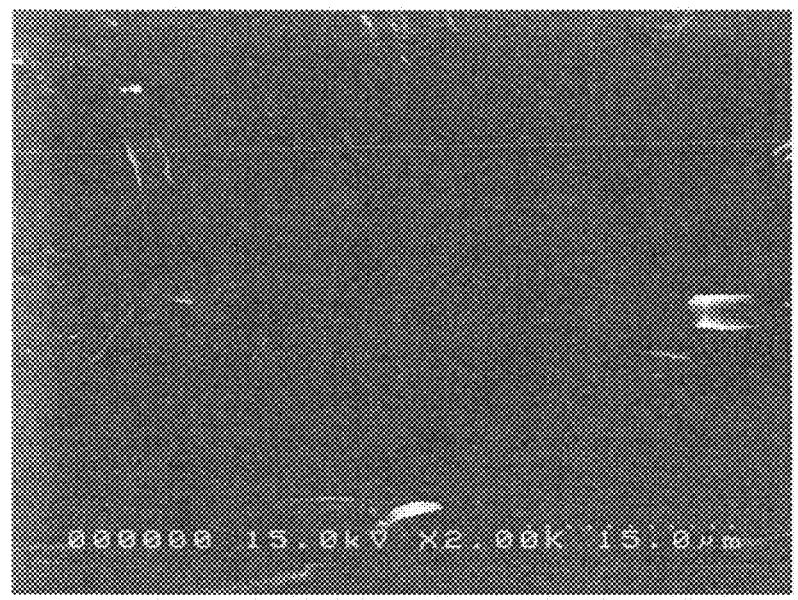
FIGS. 3 and 4 show SEM images of a beta alumina solid electrolyte prepared according to Example 1.
Figure 4:
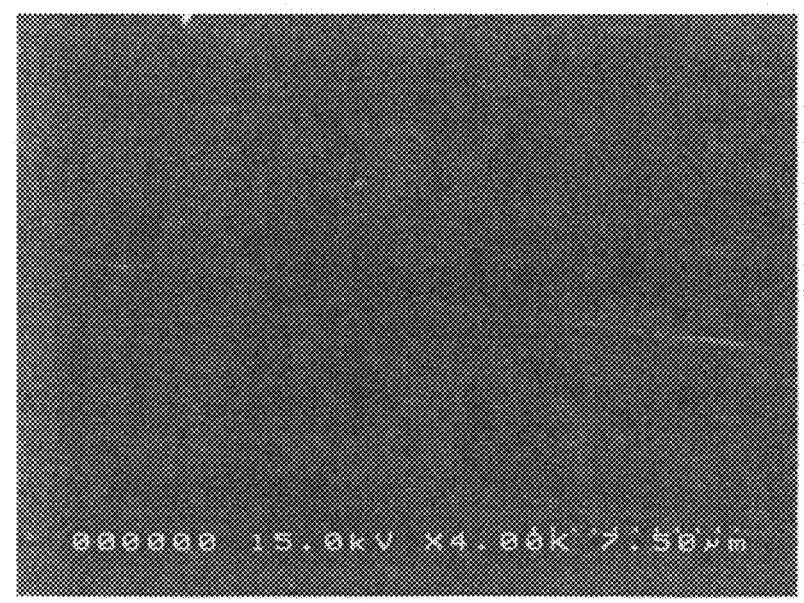

As shown in FIGS. 1 and 2, the solid electrolyte of Comparative Example 1 has large pores in various shapes. On the other hand, as shown in FIGS. 3 and 4, the beta alumina solid electrolyte of Example 1 has no pores. Also, the solid electrolyte of Comparative Example 1 has a grain boundary between particles, and particles of the beta alumina solid electrolyte of Example 1 do not have a grain boundary. Also, the SEM images of Example 1 have white dots in the form of nanodots. This may be because the beta alumina solid electrolyte phase powder used before the heat treatment had a small size of about 20 nm.

A relative density and a porosity of each of the solid electrolytes of Comparative Example 1 and the beta alumina solid electrolyte of Example 1 were measured by using an Archimedes method. According to the Archimedes method, the relative density and the porosity of a sample may be calculated from a weight of the sample wholly immersed in the water, that is, a weight of water that is flooded corresponding to a volume of sample. The relative density may be calculated by dividing a bulk density ($D_b$) by a theoretical density. The porosity may be calculated by dividing a difference between a theoretical density and a bulk density by the theoretical density.

To do so, the bulk density was measured as follows. First, deionized water was sufficiently boiled at a temperature of 100° C., and then a sample was added to the deionized water at a temperature of 100° C. and sufficiently boiled for about 6 hours. The boiling was performed to allow water to sufficiently permeate into pores at a surface of the sample. The sufficiently boiled sample was suspended in water using a spring to measure a suspended weight. Then, the sample was taken out of the water and water at the surface of the sample was removed to measure a saturated weight. In this process, the removing of the water was carefully performed so as not to remove water that had permeated into the surface of the sample. Drying was performed thereon at a temperature of 130° C. to completely remove water that had permeated into the surface of the sample for 6 hours or more to measure a dried weight. The measured weights were used to calculate a relative density and a porosity by using the following equations, and the results are shown in Table 1 below.

Bulk Density($D_b$,g/cm$^3$)=$W_d/(N_s-W_{ss}) \times D_w$

Relative Density(RD,%)=$D_b/D_t \times 100$

Porosity(%)=$(D_t-D_b)/D_t \times 100$ $W_d$:dried weight,$W_s$:suspended weight,$W_{ss}$:Saturated weight $D_t$:true density,$D_w$:density of water at $T°$ C.

Also, pore sizes and grain sizes of the BASEs shown in the SEM images were analyzed, and the results are shown together in Table 1 below.

TABLE 1

| | Relative density | Porosity | Pore size | Grain Size |
|---|---|---|---|---|
| Example 1 | 99.7% or more | 0.3% | Not observed | No grain boundary (Very small grains in the form of nanodots) |
| Comparative Example 1 | 97 to 98% | 2 to 3% | 3 to 5 μm | About 20 μm |

As shown in FIGS. 1 to 4, and in Table 1, it is confirmed that the beta alumina solid electrolyte of Example 1 has a relatively high density and a relatively low porosity and thus has a fine microstructure.

Figure 5:
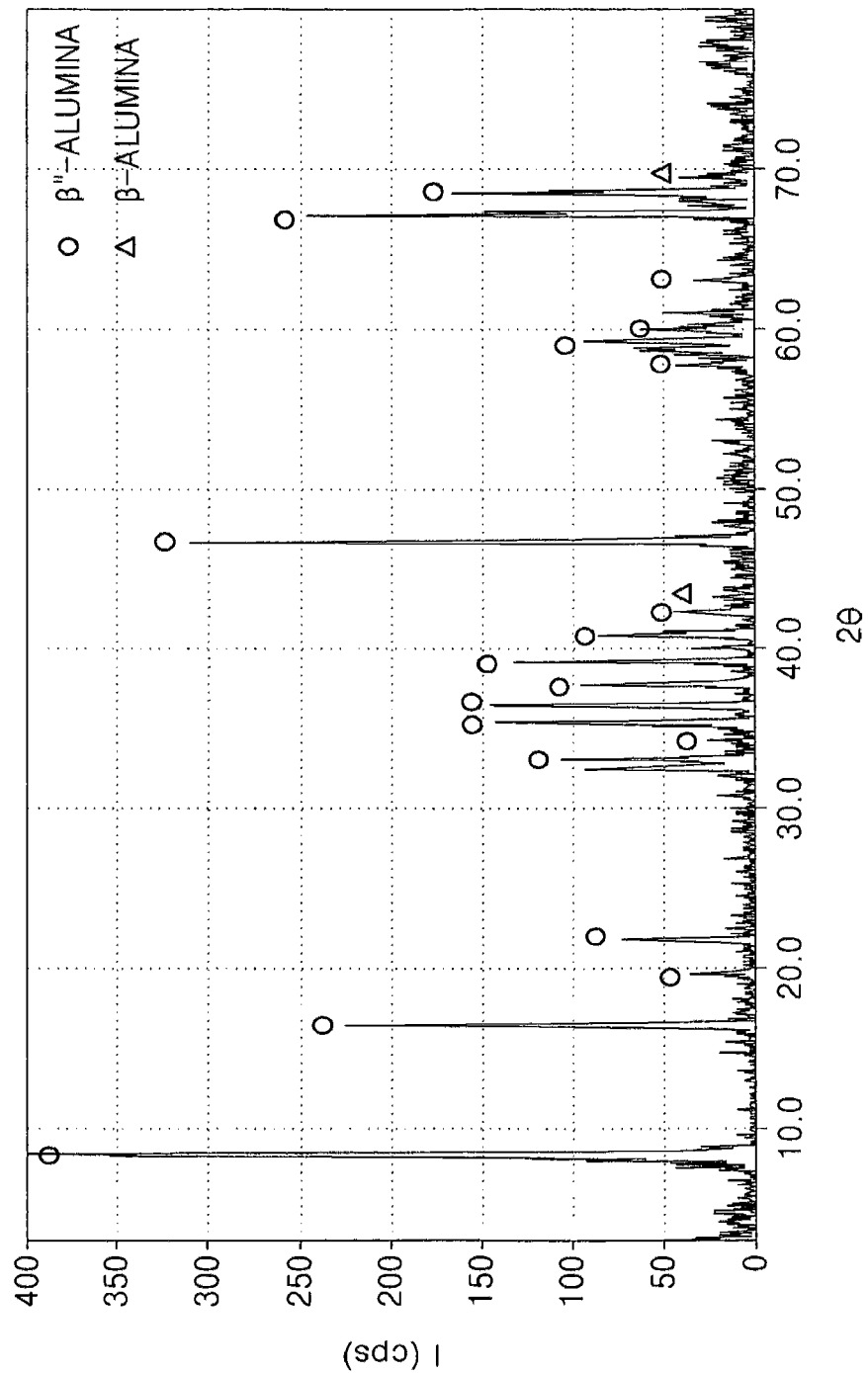
FIG. 5 shows analysis results of an X-ray diffraction pattern of a beta alumina solid electrolyte prepared according to Comparative Example 1.
Figure 6:
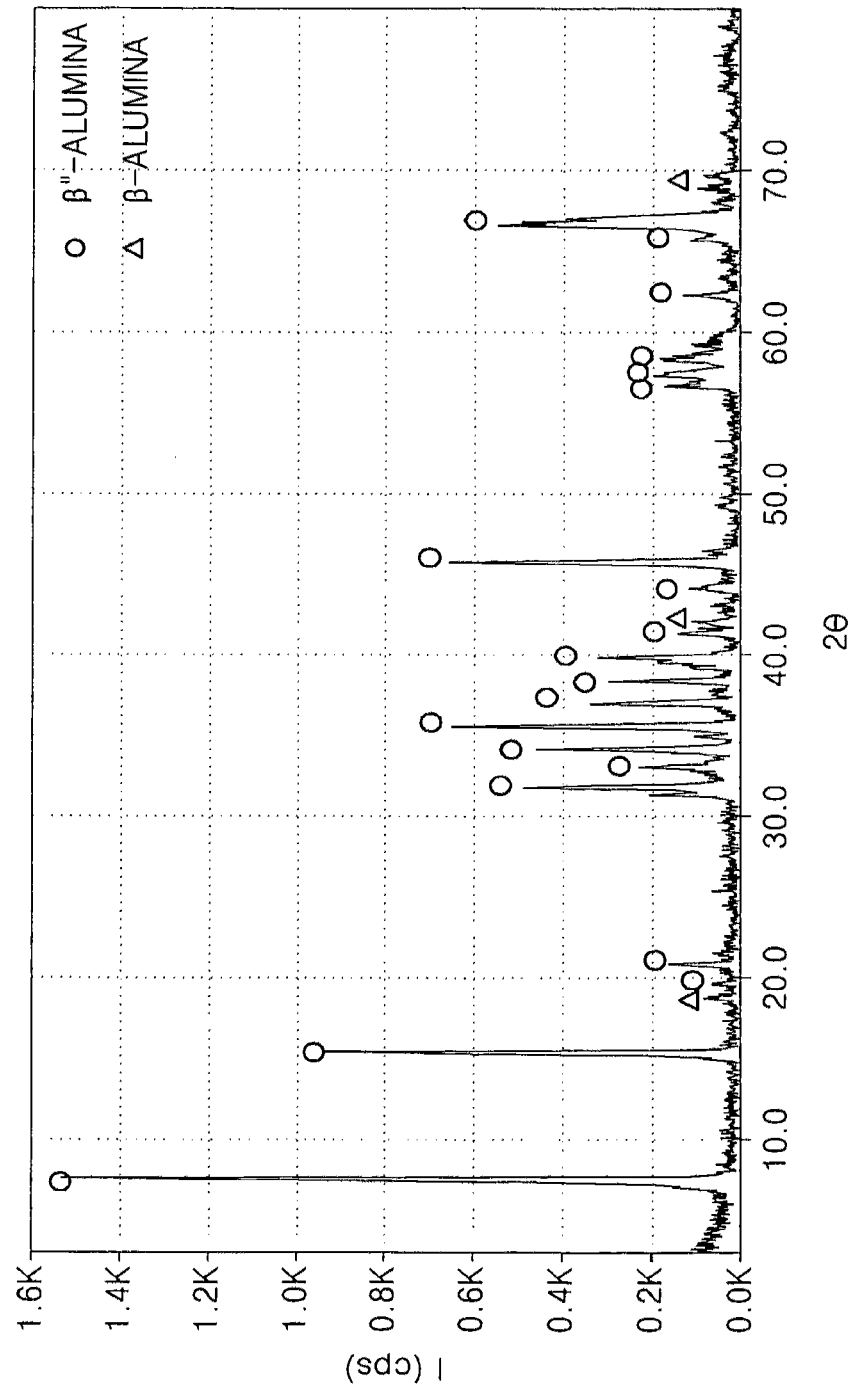
FIG. 6 shows analysis results of an X-ray diffraction pattern of a beta alumina solid electrolyte prepared according to Example 1.

X-ray diffraction patterns of the solid electrolyte of Comparative Example 1 and the beta alumina solid electrolyte of Example 1 were measured using a CuKα ray and the results are respectively shown in FIGS. 5 and 6.

As shown in FIGS. 5 and 6, it is confirmed that the beta alumina solid electrolyte of Example 1 has a two to four times higher main peak intensity and is more crystallized than the solid electrolyte of Comparative Example 1.

Also, regarding the beta alumina solid electrolyte of Example 1, a peak corresponding to a β"-alumina crystal phase appeared even at a diffraction angle 2θ of about 43.5° to about 44.5°, in addition to about 7.0° to about 8.0°, about 15.0° to about 16.0°, about 45.0° to about 46.0°, and about 66.5° to about 67.5°, and the peak at the diffraction angle 2θ of about 43.5° to about 44.5° was not present in the case of the solid electrolyte of Comparative Example 1. In this regard, a peak intensity ratio of $I_1/I_2$ (where, $I_1$ and $I_2$ refer to intensity heights of a first peak (about 7.0° to about 8.0°) and a second peak (about 45.0° to about 46.0°)) was about 0.4. Also, in the diffraction angle 2θ range of about 66.0° to about 69.0°, the solid electrolyte of Comparative Example 1 had two peaks corresponding to a β"-alumina crystal phase, whereas the beta alumina solid electrolyte of Example 1 had only one peak in the same range.

The beta alumina solid electrolyte of Example 1 had peaks at a diffraction angle 2θ of about 18.5° to about 19.0°, about 43.5° to about 44.5°, and about 68.5°about 70.0°. In this regard, the peak at the diffraction angle 2θ of about 18.5° to about 19.0° was not present in the diffraction pattern of the solid electrolyte of Comparative Example 1. Also, at the diffraction angle 2θ of about 68.5° to about 70.0°, the beta alumina solid electrolyte of Example 1 had two peaks and the solid electrolyte of Comparative Example 1 had only one peak.

As described above, when a method of preparing a beta alumina solid electrolyte according to an embodiment of the present invention is used, sintering is performed at a relatively low temperature, and evaporation of sodium is suppressed, thereby enabling accurate control and/or realization of a desired (target) composition of a beta alumina solid electrolyte. Also, the produced beta alumina solid electrolyte has a high density and a low porosity.

As described above, in a method of preparing a beta alumina solid electrolyte according to the one or more of the above embodiments of the present invention, sintering is performed at low temperature, and evaporation of sodium is suppressed, thereby producing beta alumina solid electrolyte having a high density, a low porosity, and a composition that is at almost the same level as a desired (target) composition. The beta alumina solid electrolyte produced as described above has high durability and high electrical characteristics and thus is effectively used in a thermoelectric converter, a battery, a sensor, and a display.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A beta alumina solid electrolyte comprising nano-sized beta alumina primary particles, wherein a porosity of the beta alumina solid electrolyte is less than 2%.

2. The beta alumina solid electrolyte of claim 1, wherein the porosity is about 0.01% to about 1%.

3. The beta alumina solid electrolyte of claim 1, wherein an average diameter of the beta alumina primary particles is about 1 nm to about 80 nm.

4. The beta alumina solid electrolyte of claim 1, wherein an average diameter of the beta alumina primary particles is about 10 nm to about 50 nm.

5. The beta alumina solid electrolyte of claim 1, wherein a relative density of the beta alumina solid electrolyte is equal to or greater than 99%.

6. The beta alumina solid electrolyte of claim 1, wherein a grain boundary is not present among the beta alumina primary particles.

7. The beta alumina solid electrolyte of claim 1, wherein the beta alumina solid electrolyte has a first peak at a diffraction angle 2θ of about 7.0° to about 8.0° and a second peak at a diffraction angle 2θ of about 45.0° to about 46.0° in an X-ray diffraction pattern measured using a CuKα ray, and a peak intensity ratio of the first peak to the second peak, that is, $I_1/I_2$, is about 0.3 to about 0.6.

8. The beta alumina solid electrolyte of claim 1, wherein the beta alumina solid electrolyte has a third peak at a diffraction angle 2θ of about 43.5° to about 44.5° in an X-ray diffraction pattern measured using a CuKα ray.

9. The beta alumina solid electrolyte of claim 1, wherein the beta alumina solid electrolyte has a fourth peak at a diffraction angle 2θ of about 18.5° to about 19.0° in an X-ray diffraction pattern measured using a CuKα ray.

10. The beta alumina solid electrolyte of claim 1, wherein the beta alumina solid electrolyte has a first peak at a diffraction angle 2θ of about 7.0° to about 8.0°, a second peak at a diffraction angle 2θ of about 45.0° to about 46.0°, a third peak at a diffraction angle 2θ of about 43.5° to about 44.5°, and a fourth peak at a diffraction angle 2θ of about 18.5° to about 19.0° in an X-ray diffraction pattern measured using a CuKα ray.

11. The beta alumina solid electrolyte of claim 10, wherein a peak intensity ratio of the first peak to the second peak, that is, $I_1/I_2$, is about 0.3 to about 0.6.

12. The beta alumina solid electrolyte of claim 1, wherein the beta alumina primary particles are sintered particles having nanodots.

* * * * *